US011176368B2

(12) United States Patent
Baughman et al.

(10) Patent No.: US 11,176,368 B2
(45) Date of Patent: Nov. 16, 2021

(54) VISUALLY FOCUSED FIRST-PERSON NEURAL NETWORK INTERPRETATION

(71) Applicant: INTERNATIONAL BUSINESS MACHINES CORPORATION, Armonk, NY (US)

(72) Inventors: Aaron K. Baughman, Cary, NC (US); Gopal Sarma Pingali, Bangalore (IN); Maria del Pilar Belinchon Ballesta, Madrid (ES); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 16/515,751

(22) Filed: Jul. 18, 2019

(65) Prior Publication Data

US 2020/0394401 A1 Dec. 17, 2020

(30) Foreign Application Priority Data

Jun. 13, 2019 (EP) .................................... 19382493

(51) Int. Cl.
  *G06K 9/00* (2006.01)
  *G06N 3/04* (2006.01)
  (Continued)

(52) U.S. Cl.
  CPC ......... *G06K 9/00624* (2013.01); *G06F 17/15* (2013.01); *G06F 17/18* (2013.01);
  (Continued)

(58) Field of Classification Search
  CPC ............. G06K 9/00624; G06K 9/6267; G06N 3/0472; G06N 3/08; G06F 17/18; G06F 17/15
  See application file for complete search history.

(56) References Cited

U.S. PATENT DOCUMENTS 9,202,144 B2  12/2015  Wang et al.
9,536,293 B2   1/2017  Lin et al.
(Continued)

FOREIGN PATENT DOCUMENTS

WO  2018052875      3/2018
WO  2018102717 A1   6/2018

OTHER PUBLICATIONS

Yamashita, Rikiya, et al. "Convolutional neural networks: an overview and application in radiology." Insights into imaging 9.4 (2018): 611-629. (Year: 2018).*

(Continued)

*Primary Examiner* — Pinalben Patel
(74) *Attorney, Agent, or Firm* — Brian Restauro; Andrew D. Wright; Roberts Calderon Safran & Cole, P.C.

(57) ABSTRACT

Methods and systems for visually focused first-person neural network interpretation are disclosed. A method includes: receiving, by a computing device, an image; determining, by the computing device, feature vectors from the image; determining, by the computing device, a first padding value and a first stride value by inputting the feature vectors into a deep neural network; determining, by the computing device, a second padding value and a second stride value by inputting the feature vectors into at least one multiple regression model; determining, by the computing device, padding by averaging the first padding value and the second padding value; determining, by the computing device, stride by averaging the first stride value and the second stride value; and classifying, by the computing device, the image using a convolutional neural network using the padding and the stride.

20 Claims, 4 Drawing Sheets

(51) Int. Cl.
  *G06K 9/62* (2006.01)
  *G06F 17/15* (2006.01)
  *G06F 17/18* (2006.01)
  *G06N 3/08* (2006.01)

(52) U.S. Cl.
  CPC ......... *G06K 9/6267* (2013.01); *G06N 3/0472* (2013.01); *G06N 3/08* (2013.01)

(56) References Cited

U.S. PATENT DOCUMENTS

| | | | |
|---|---|---|---|
| 9,818,297 B2 | 11/2017 | El-Tantawy et al. | |
| 2015/0117760 A1* | 4/2015 | Wang | G06K 9/66 382/157 |
| 2016/0035078 A1* | 2/2016 | Lin | G06K 9/66 382/157 |
| 2016/0307111 A1 | 10/2016 | Baughman et al. | |
| 2017/0262735 A1* | 9/2017 | Ros Sanchez | G06K 9/4628 |
| 2018/0089834 A1 | 3/2018 | Spizhevoy et al. | |
| 2018/0129899 A1* | 5/2018 | Harron | G06N 3/0445 |
| 2018/0129974 A1 | 5/2018 | Giering et al. | |
| 2018/0260708 A1 | 9/2018 | Mnih et al. | |
| 2018/0336462 A1 | 11/2018 | Brothers | |
| 2020/0074625 A1* | 3/2020 | Ostvik | G16H 30/40 |

OTHER PUBLICATIONS

Luo et al., "Size-Invariant Fully Convolutional Neural Network for Vessel Segmentation of Digital Retinal Images", 2016 Asia-Pacific Signal and Information Processing Association Annual Summit and Conference (APSIPA), Dec. 13-16, 2016, 7 pages.

Dalmia et al., "Towards Interpretation of Node Embeddings", WWW '18 Companion: The 2018 Web Conference Companion, Apr. 23-27, 2018, 8 pages.

Anwar et al., "Structured Pruning of Deep Convolutional Neural Networks", ACM Journal on Emerging Technologies in Computing Systems (JEIC), vol. 13, issue 3, May 2017, 11 pages.

Zoph et al., "Neural Architecture Search with Reinforcement Learning", https://arxiv.org/abs/1611.01578v2, Feb. 15, 2017, 16 pages.

Real et al., "Large-Scale Evolution of Image Classifiers", ICML'17 Proceedings of the 34th International Conference on Machine Learning, vol. 70, Aug. 6-11, 2017, 18 pages.

Nah et al., "Deep Multi-scale Convolutional Neural Network for Dynamic Scene Deblurring", 2017 IEEE Conference on Computer Vision and Pattern Recognition, Jul. 21-26, 2017, 9 pages.

Tran et al., "Learning Spatiotemporal Features with 3D Convolutional Networks", 2015 IEEE International Conference on Computer Vision, Dec. 7-13, 2015, 9 pages.

Liu et al., "Progressive Neural Architecture Search", ECCV 2018, Oct. 6, 2018, 16 pages.

Fan et al., "A Generic Deep Architecture for Single Image Reflection Removal and Image Smoothing", 2017 IEEE International Conference on Computer Vision (ICCV), Oct. 2017, 30 pages.

Šošić et al., "Inverse Reinforcement Learning in Swarm Systems", Proc. of the 16th International Conference on Autonomous Agents and Multiagent Systems (AAMAS 2017), May 8-12, 2017, 9 pages.

Do et al., "Face tracking with convolutional neural network heatmap", Proceedings of the 2nd International Conference on Machine Learning and Soft Computing, Feb. 2-4, 2018, 5 pages.

Reno et al., "Convolutional Neural Networks BasedBall Detection in Tennis Games", 2018, 2 pages.

Bak et al., "Spatio-Temporal Saliency Networks for Dynamic Saliency Prediction", Nov. 15, 2017, 2 pages.

Albewi et al. "Automated Optimal Architecture of Deep Convolutional Neural Networks for Image Recognition", Dec. 18-20, 2016, 3 pages.

Bazrafkan et al., "An End to End Deep Neural Network for Iris Segmentation in Unconstraint Scenarios", Dec. 7, 2017, 49 pages.

* cited by examiner

VISUALLY FOCUSED FIRST-PERSON NEURAL NETWORK INTERPRETATION

BACKGROUND

The present invention generally relates to computing devices and, more particularly, to methods and systems for visually focused first-person neural network interpretation.

A convolutional neural network (CNN) is an artificial intelligence technique that interprets images to discover features. Features discovered using a CNN are optionally fed into a feed forward neural network to recognize various objects in the images.

SUMMARY

In a first aspect of the invention, there is a method that includes: receiving, by a computing device, an image; determining, by the computing device, feature vectors from the image; determining, by the computing device, a first padding value and a first stride value by inputting the feature vectors into a deep neural network; determining, by the computing device, a second padding value and a second stride value by inputting the feature vectors into at least one multiple regression model; determining, by the computing device, padding by averaging the first padding value and the second padding value; determining, by the computing device, stride by averaging the first stride value and the second stride value; and classifying, by the computing device, the image using a convolutional neural network using the padding and the stride.

In another aspect of the invention, there is a computer program product that includes a computer readable storage medium having program instructions embodied therewith. The program instructions are executable by a computing device to cause the computing device to: train a neural network modeling padding and stride, a regression model for padding, and a regression model for stride using a training data set including descriptors and corresponding padding and stride values; receive an image; determine a first padding value and a first stride value using the image and the neural network modeling padding and stride; determine a second padding value using the image and the regression model for padding; determine a second stride value using the image and the regression model for stride; determine padding by averaging the first padding value and the second padding value; determine stride by averaging the first stride value and the second stride value; and classify the image using a convolutional neural network using the padding and the stride.

In another aspect of the invention, there is a system that includes: a hardware processor, a computer readable memory, and a computer readable storage medium associated with a computing device; program instructions to receive an image; program instructions to determine feature vectors from the image; program instructions to determine a first padding value and a first stride value by inputting the feature vectors into a deep neural network; program instructions to determine a second padding value and a second stride value by inputting the feature vectors into at least one multiple regression model; program instructions to determine padding by averaging the first padding value and the second padding value; program instructions to determine stride by averaging the first stride value and the second stride value; and program instructions to classify the image using a convolutional neural network using the padding and the stride, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for visually focused first-person neural network interpretation. As described herein, aspects of the invention include a method and system for training a neural network modeling padding and stride, training a multiple regression model for padding and a multiple regression model for stride, using the trained neural networks and the trained multiple regression models to determine padding and stride, determining a convolutional layer output dimension, and using a CNN to perform image classification using the determined values for padding, stride, and convolutional layer output dimension.

In conventional CNNs, hyperparameters (e.g., padding, stride, etc.) are fixed throughout an application of a CNN to a computer vision problem. Embodiments improve CNNs by providing methods and systems for learning the stride of each layer in a CNN while also altering the spatial identification of features.

In particular, in conventional CNNs, static hyperparameters are a common feature. CNN models are increasingly applied to images where objects are moving. As images and video are taken from mobile devices and combined or adjusted from multiple vantage points where a subject is moving, conventional CNNs are unable to dynamically adjust hyperparameters including padding and stride. The conventional brute force trial-and-error approach to adjusting the hyperparameters including padding and stride for a CNN is insufficient.

Embodiments address the problem of adjusting the hyperparameters of a CNN such that the movement of objects (e.g., a ball) relative to a person (e.g., a tennis player) have an impact on how the CNN recognizes the objects. Accordingly, embodiments provide improved CNNs that may be used to better train people (e.g., to play sports, drive, or fly) or to more realistically augment reality. As objects and people move, the field of view and focal point for a human changes. Embodiments align how computer vision techniques are used to analyze an image such that they correspond with the focal point of a human, thereby improving a first-person computer vision understanding of the image.

Aspects of the present invention learn how to change the focus of pixels at each step of a CNN while also altering the spatial identification of features. The stride of each layer within a CNN is learned and determined based on feature vectors of a person and objects in an input image. The stride determines the spatial relationship of discovered features in the CNN. At the same time, the padding around each layer of a CNN helps to focus the attention of a CNN around specific regions of an input image.

Accordingly, embodiments improve the functioning of a computer by providing methods and systems for visually focused first-person neural network interpretation. In particular, embodiments improve software by providing methods and systems for learning of spatial interpretation of pixel values in a CNN through stride magnitude. Additionally, embodiments improve software by providing methods and systems for learning of focus interpretation of pixel values in a CNN through padding shapes. Additionally, embodiments improve software by providing methods and systems for discovering stride and padding values from real world feature vectors. Additionally, embodiments improve software by providing for trending of padding and stride values based on object movement in the world and input into CNN deepening CNN layers. Additionally, embodiments improve software by providing for a teachable and trainable interpretation of video and images based on a first-person understanding, real time and adjustable learning of spatial relationships of interpretable features in an image, and real time and adjustable learning of focus areas within an image.

Accordingly, through the use of rules that improve computer-related technology, implementations of the invention allow computer performance of functions not previously performable by a computer. Additionally, implementations of the invention use techniques that are, by definition, rooted in computer technology (e.g., machine learning and artificial intelligence techniques, including deep neural networks, feed forward neural networks, CNNs, and computer vision).

In an example, as a person is moving throughout space or is focusing on a specific area within the person's field of view, stride and padding are determined so as to provide visual augmentation. In particular, in the case of a person playing tennis, player movement is tracked, including redirect step, lateral movement, diagonal movement, and distance run. Additionally, the ball position (x,y,z) is tracked to determine what the player is viewing when the player hits the ball. The feature vector of the positions of the ball and player are input into an ensemble of models that include a multiple regression polynomial and a feed forward neural network. More specifically, a first regression model learns padding variables, and a second regression models stride variables, and a single deep neural network outputs both padding and stride variables. The models are averaged together to provide the padding and stride that aligns with the real world situation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
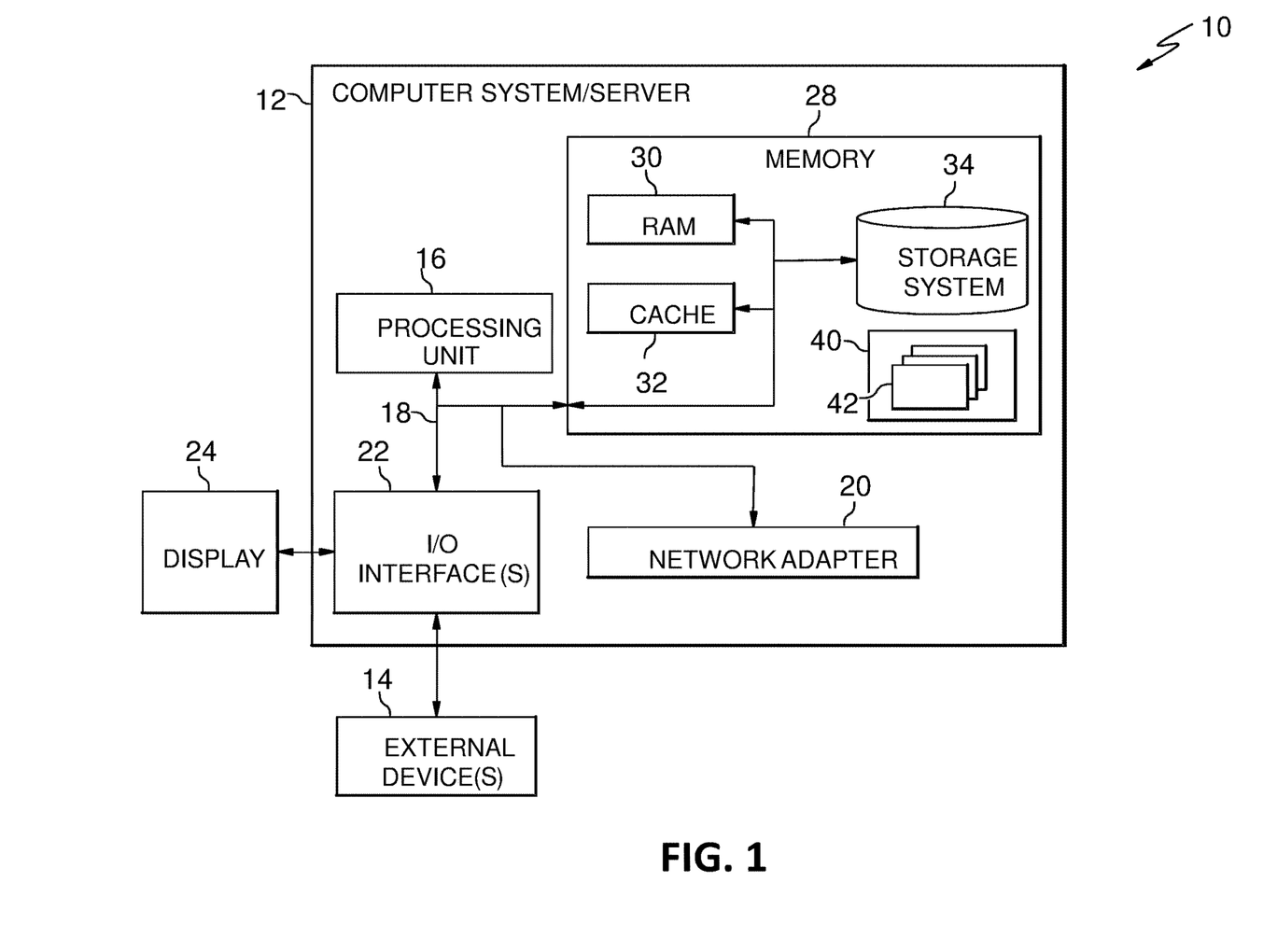
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
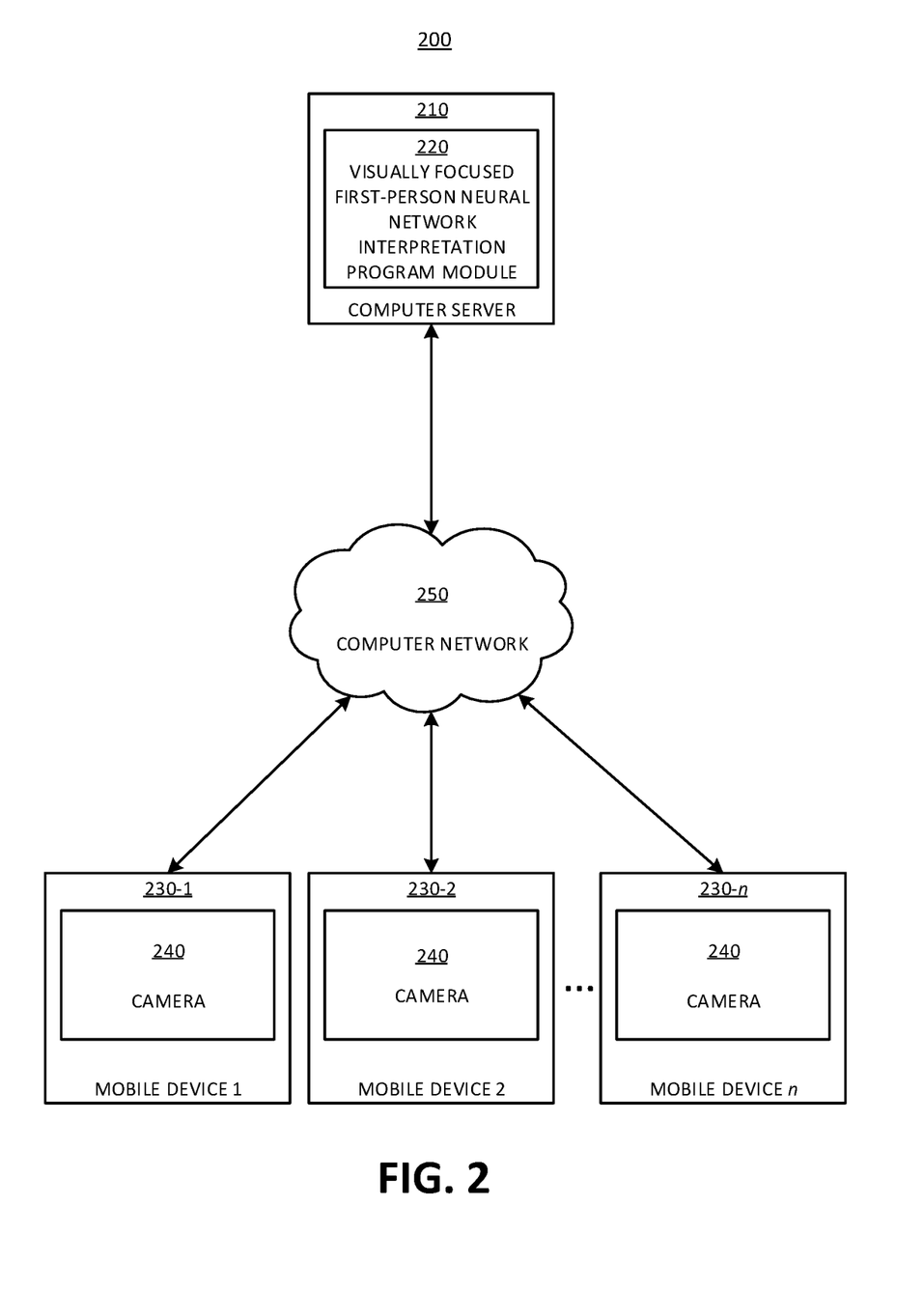
FIG. 2 depicts an illustrative environment in accordance with aspects of the invention.

FIG. 2 depicts an illustrative environment 200 in accordance with aspects of the invention. As shown, the environment 200 comprises a computer server 210 and a plurality of mobile devices 230-1, 230-2, . . . , 230-n which are in communication via a computer network 250. In embodiments, the computer network 250 is any suitable network including any combination of a LAN, WAN, or the Internet. In embodiments, the computer server 210 and the plurality of mobile devices 230-1, 230-2, . . . , 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a visually focused first-person neural network interpretation program module 220, which includes hardware and/or software such as one or more of the program modules 42 shown in FIG. 1. The visually focused first-person neural network interpretation program module 220 includes program instructions for performing visually focused first-person neural network interpretation of digital images (e.g., frames from digital video and/or digital still images) from the plurality of mobile devices 230-1, 230-2, . . . , 230-n. In embodiments, the program instructions included in the visually focused first-person neural network interpretation program module 220 of the computer server 210 are executed by one or more hardware processors.

In embodiments, the visually focused first-person neural network interpretation program module 220 trains a neural network modeling padding and stride, trains a multiple regression model for padding and a multiple regression model for stride, uses the trained neural network and the trained multiple regression models to determine padding and stride, determines a convolutional layer output dimension, and uses a CNN to perform image classification using the determined values for padding, stride, and convolutional layer output dimension.

Still referring to FIG. 2, in embodiments, each of the plurality of mobile devices 230-1, 230-2, . . . , 230-n is a computer device comprising one or more elements of the computer system/server 12 (as shown in FIG. 1). In particular, each of the plurality of mobile devices 230-1, 230-2, . . . , 230-n is a mobile device such as a cellular phone, tablet, personal digital assistant (PDA), laptop computer, or any other mobile computing device. In another embodiment, one or more of the plurality of mobile devices 230-1, 230-2, . . . , 230-n is any other type of computer device (e.g., a desktop computer, server, etc.).

In embodiments, each of the plurality of mobile devices 230-1, 230-2, . . . , 230-n includes a camera 240 which is a digital video camera or a digital still camera that captures digital video (optionally including audio) and/or digital images (e.g., using a charge-coupled device (CCD) or complementary metal-oxide-semiconductor (CMOS) sensor). Each of the plurality of mobile devices 230-1, 230-2, . . . , 230-n transmits digital video and/or digital still images captured by the camera 240 to the computer server 210 for visually focused first-person neural network interpretation by the visually focused first-person neural network interpretation program module 220.

Figure 3:
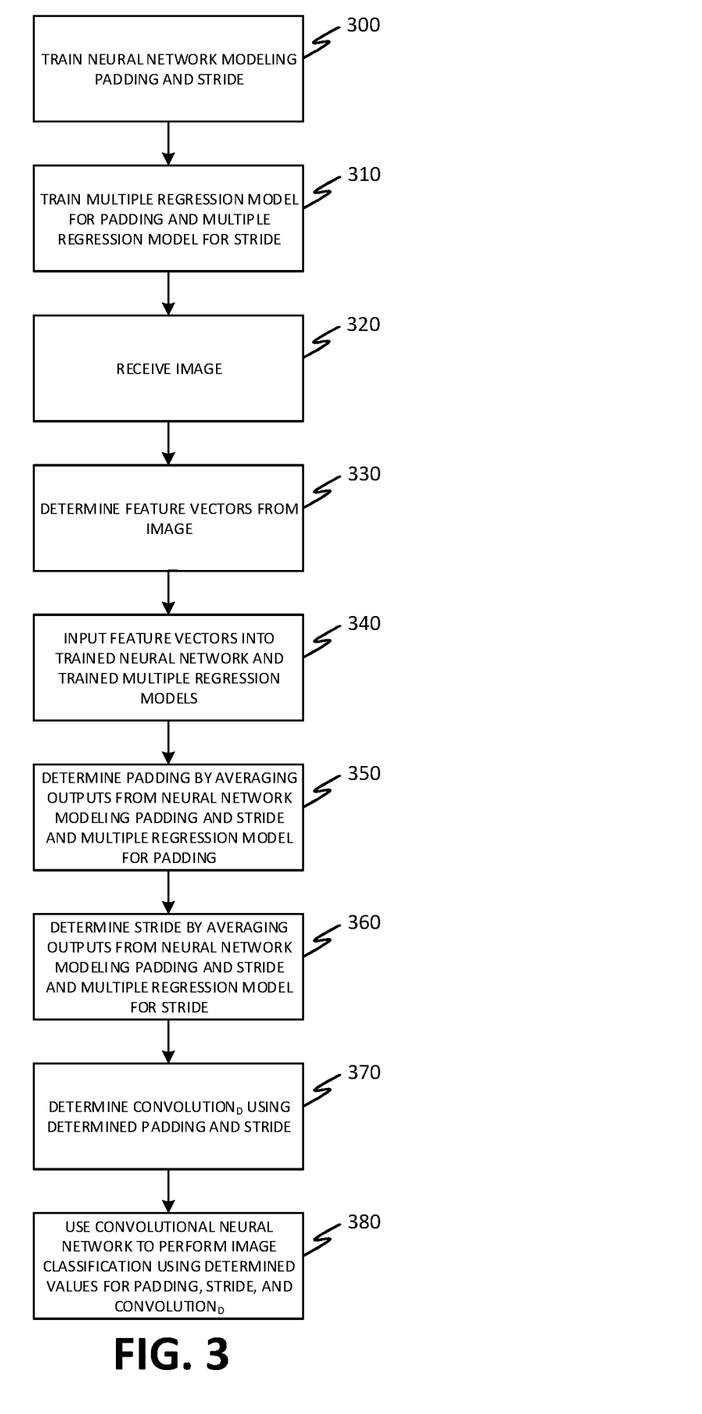
FIG. 3 depicts a flowchart of an exemplary method performed in accordance with aspects of the invention.

FIG. 3 depicts a flowchart of an exemplary method performed by the visually focused first-person neural network interpretation program module 220 of the computer server 210 in accordance with aspects of the invention. The steps of the method are performed in the environment of FIG. 2 and are described with reference to the elements shown in FIG. 2.

In embodiments, before an image is analyzed using a CNN, the visually focused first-person neural network interpretation program module 220 determines hyperparameters including stride and padding, in accordance with the method of FIG. 3. The stride of a CNN determines the resolution of a rolling window used in the CNN. In particular, the stride down samples the element wise product into an output matrix (output volume). Stride controls how a filter in the CNN convolves around the input volume (e.g., a number of pixels between windowing operations). The down sampling finds features with a certain overlap of pixel values.

In embodiments, an input image to be analyzed by the CNN is padded to ensure that information from the edges of the input image is not discarded. As a result of padding, the edge pixels are used in more of the convolutional processes. In embodiments, the visually focused first-person neural network interpretation program module 220 selects a padding parameter that does not shrink the image (e.g., a relatively larger padding parameter). In other embodiments, the visually focused first-person neural network interpretation program module 220 selects a padding parameter that shrinks an image to correspond with a person's field of view (e.g., in rainy conditions, a person's field of view may be limited, and a relative smaller padding parameter may be selected). In embodiments, the visually focused first-person neural network interpretation program module 220 adds padding by imputing pixel values around edges of an image (or edges of a mask applied to the image).

At step 300, the computer server 210 trains a neural network modeling padding and stride. In embodiments, step 300 comprises the visually focused first-person neural network interpretation program module 220 of the computer server 210 training a deep neural network (e.g., a feed forward neural network) modeling padding and stride.

In particular, at step 300, the visually focused first-person neural network interpretation program module 220 uses a training data set labeled with padding and stride values to train the deep neural network, dnn (shown below), modeling padding and stride. In an example, the training data set may include tennis descriptors (e.g., ball speed, ball height, hit location, player location etc.) and padding and stride values corresponding to particular sets of tennis descriptors.

$$dnn_{state}(\overline{a_p} \cup \overline{b_p} \cup \overline{s_p}) = l_{96}(l_{95}(l \ldots (L_0(\overline{a_p} \cup \overline{b_p} \cup \overline{s_p}))))$$

At step 310, the computer server 210 trains a multiple regression model for padding and a multiple regression model for stride. In embodiments, step 310 comprises the visually focused first-person neural network interpretation program module 220 of the computer server 210 training a first multiple regression model for padding and a second multiple regression model for stride.

In particular, at step 310, the visually focused first-person neural network interpretation program module 220 uses the training data set labeled with padding and stride values to train multiple regression polynomials (shown below). Specifically, at step 310, the visually focused first-person neural network interpretation program module 220 trains the first multiple regression model for padding and trains the second multiple regression model for stride using the training data set, by decomposing data in the training data set into predictors and optimizing the multiple regression polynomials based on the labeled padding and stride values associated with the predictors.

$$y_i = \beta_0 1 + \beta_1 x_{i1} + \ldots + \beta_p x_{ip} + \varepsilon_i = x_i^T \beta + \varepsilon_i, \; i=1, \ldots, n,$$

At step 320, the computer server 210 receives an image. In embodiments, step 320 comprises the visually focused first-person neural network interpretation program module 220 of the computer server 210 receiving an input image from at least one of the plurality of mobile devices 230-1, 230-2, . . . , 230-n (e.g., a digital still image that is a frame from a digital video from the camera 240 of one of the plurality of mobile devices 230-1, 230-2, . . . , 230-n). In an example, the image may be an image of one or more people playing a sport (e.g., tennis). In embodiments, a mask is applied to a portion of the input image received at step 320 that is to be analyzed by the CNN (i.e., one or more CNN filters are applied to the masked portion of the input image). In embodiments, the mask size (i.e., before adding padding) initially corresponds to filter size.

At step 330, the computer server 210 determines feature vectors from the image. In embodiments, step 330 comprises the visually focused first-person neural network interpretation program module 220 of the computer server 210 determining feature vectors of objects in the image received from at least one of the plurality of mobile devices 230-1, 230-2, . . . , 230-n at step 320. In an example, the feature vectors include feature vectors of a person (e.g., a tennis player) and feature vectors of an object (e.g., a tennis ball) in the image.

At step 340, the computer server 210 inputs the feature vectors into the trained neural network and trained multiple regression models. In embodiments, step 340 comprises the visually focused first-person neural network interpretation program module 220 of the computer server 210 inputting the feature vectors determined at step 330 from the image received at step 320 into the deep neural network modeling padding and stride trained at step 300 and into the first multiple regression model for padding and the second multiple regression model for stride trained at step 310.

At step 350, the computer server 210 determines padding by averaging outputs from the neural network modeling padding and stride and the multiple regression model for padding. In embodiments, step 350 comprises the visually focused first-person neural network interpretation program module 220 of the computer server 210 determining the padding value, p, by averaging a first padding value output from the deep neural network modeling padding and stride in response to the input of the feature vectors at step 340 with a second padding value output from the first multiple regression model for padding in response to the input of the feature vectors at step 340.

At step 360, the computer server 210 determines stride by averaging outputs from the neural network modeling padding and stride and the multiple regression model for stride. In embodiments, step 360 comprises the visually focused first-person neural network interpretation program module 220 of the computer server 210 determining the stride value, s, by averaging a first stride value output from the deep neural network modeling padding and stride in response to the input of the feature vectors at step 340 with a second stride value output from the first multiple regression model for padding in response to the input of the feature vectors at step 340.

At step 370, the computer server 210 determines convolution$_d$ using the determined padding and stride. In embodiments, step 370 comprises the visually focused first-person neural network interpretation program module 220 of the computer server 210 using the equation below, the padding value p determined at step 350, and the stride value s determined at step 360 to determine the convolutional layer output dimension (i.e., output volume size), convolution$_d$, where n is the input volume size (i.e., the dimension of the image received at step 320 or the dimension of a masked portion of the image received at step 320 across which filters of the CNN are to be convolved) and f is the dimension of the filter (i.e., the receptive field size):

$$convolution_d = \left\lfloor \frac{n + 2p - f}{s} + 1 \right\rfloor$$

At step 380, the computer server 210 uses a convolutional neural network to perform image classification using the determined values for padding, stride, and convolution$_d$. In particular, in embodiments, the image classification performed includes predicting categories for features and/or objects in the padded image (or the padded masked portion of the image). In embodiments, step 380 comprises the visually focused first-person neural network interpretation program module 220 of the computer server 210 padding the image received at step 320 (or padding the masked portion of the image received at step 320) with p pixels (as determined at step 350). The visually focused first-person neural network interpretation program module 220 then convolves one or more filters of the CNN, each of which detects a different feature, across the width and height of the padded image (or across the width and height of the padded masked portion of the image), using the stride s (as determined at step 360), to generate, for each of the one or more filters, a feature map (activation map) with the dimension convolution$_d$ (determined at step 370). In embodiments, the mask is moved received across the image received at step 320 according to the stride s, and each of the one or more filters is convolved across each of the pixels in the masked portion of the image.

Still referring to step 380, the visually focused first-person neural network interpretation program module 220 then uses CNN techniques to identify features in the image received at step 320 (or the masked portion of the image received at step 320). The visually focused first-person neural network interpretation program module 220 optionally feeds the identified features into a feed forward neural network to recognize (e.g., predict categories for) various objects in the image received at step 320 (or the masked portion of the image received at step 320). The flow then returns to step 320, where a new image is received. Accordingly, padding and stride are recomputed for the new image, as described above. In another embodiment, padding and stride are recomputed at predetermined intervals.

In embodiments, the above-described method performed by the visually focused first-person neural network interpretation program module 220 of the computer server 210 is used in computer software for training persons to perform various activities (e.g., playing sports, driving, flying, etc.). In other embodiments, the above-described method is used in computer software for augmented reality. The above-described method provides for computer vision techniques to adapt to (e.g., more closely match) the focal point of a human as objects and people move within images that are analyzed by a CNN.

Figure 4:
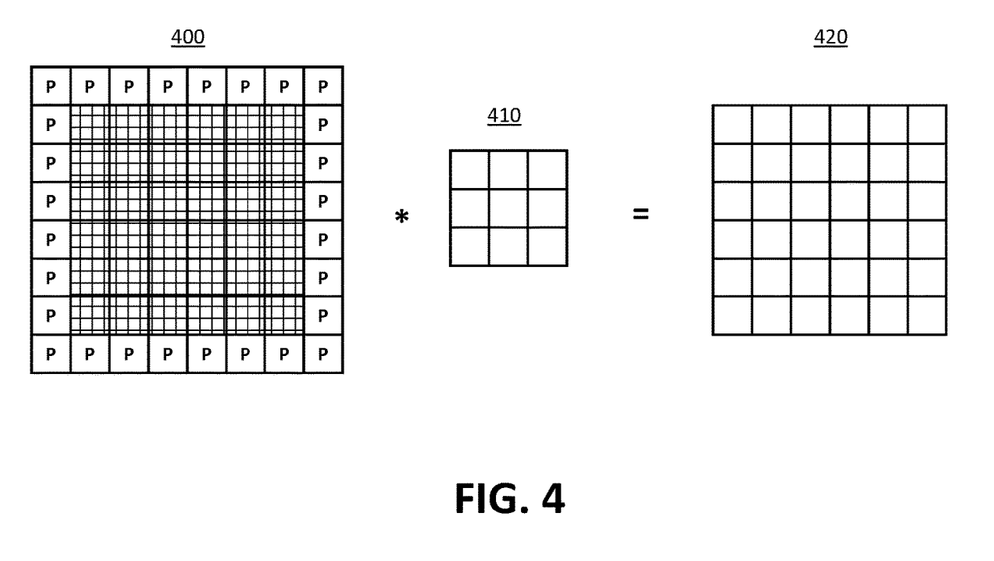
FIG. 4 depicts an example of a padded image, filter, and output volume in accordance with aspects of the invention.

FIG. 4 depicts an example of a padded image 400, filter 410, and output volume 420 in accordance with aspects of the invention. In the example illustrated in FIG. 4, an input image with dimensions (6, 6) has been padded (P) with p=1, determined as described above with reference to step 350 (of FIG. 3), to create a padded image 400 with dimensions (8, 8). The filter 410 with dimensions (3, 3) (i.e., f=3) is convolved about the padded image 400 with stride s=1, determined as described above with reference to step 360 (of FIG. 3) to generate an output volume 420 with dimensions (6, 6) (i.e., convolution$_f$=6), determined as described above with reference to step 370 (of FIG. 3).

Accordingly, it is understood from the foregoing description that embodiments of the invention provide a method for learning spatial interpretation and focus interpretation of pixel values of received images in a CNN through stride magnitude and padding shapes; and changing focus of pixels in real time at each step of a CNN while altering spatial identification features of the received images.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, an image;
determining, by the computing device, feature vectors from the image;
determining, by the computing device, a first padding value and a first stride value by inputting the feature vectors into a deep neural network;
determining, by the computing device, a second padding value and a second stride value by inputting the feature vectors into at least one multiple regression model;
determining, by the computing device, padding by averaging the first padding value and the second padding value;
determining, by the computing device, stride by averaging the first stride value and the second stride value; and
classifying, by the computing device, the image using a convolutional neural network using the padding and the stride.

2. The method according to claim 1, wherein the computing device receives the image from a mobile device.

3. The method according to claim 1, wherein the feature vectors include a feature vector of a person in the image and a feature vector of an object in the image.

4. The method according to claim 1, further comprising training, by the computing device, the deep neural network using a training data set including descriptors and corresponding padding and stride values.

5. The method according to claim 1, further comprising training, by the computing device, the at least one multiple regression model using a training data set including descriptors and corresponding padding and stride values.

6. The method according to claim 1, further comprising masking, by the computing device, a portion of the image.

7. The method according to claim 6, wherein the classifying the image using the convolutional neural network comprises convolving a filter across the masked portion of the image.

8. A computer program product comprising a computer readable storage medium having program instructions embodied therewith, the program instructions executable by a computing device to cause the computing device to:
train a neural network modeling padding and stride, a regression model for padding, and a regression model for stride using a training data set including descriptors and corresponding padding and stride values;
receive an image;
determine a first padding value and a first stride value using the image and the neural network modeling padding and stride;
determine a second padding value using the image and the regression model for padding;

determine a second stride value using the image and the regression model for stride;

determine padding by averaging the first padding value and the second padding value;

determine stride by averaging the first stride value and the second stride value; and classify the image using a convolutional neural network using the padding and the stride.

9. The computer program product according to claim 8, wherein the image is received from a mobile device.

10. The computer program product according to claim 8, the program instructions further being executable by the computing device to cause the computing device to determine feature vectors from the image.

11. The computer program product according to claim 10, wherein the determining the first padding value and the first stride value comprises inputting the feature vectors into the neural network modeling padding and stride.

12. The computer program product according to claim 10, wherein the determining the second padding value comprises inputting the feature vectors into the regression model for padding, and the determining the second stride value comprises inputting the feature vectors into the regression model for stride.

13. The computer program product according to claim 10, wherein the feature vectors include a feature vector of a person in the image and a feature vector of an object in the image.

14. The computer program product according to claim 8, the program instructions further being executable by the computing device to cause the computing device to mask a portion of the image.

15. The computer program product according to claim 14, wherein the classifying the image using the convolutional neural network comprises convolving a filter across the masked portion of the image.

16. A system comprising:
a hardware processor, a computer readable memory, and a computer readable storage medium associated with a computing device;
program instructions to train a deep neural network modeling padding and stride;
program instructions to train a first multiple regression model for padding;
program instructions to train a second multiple regression model for stride;
program instructions to receive an image;
program instructions to determine feature vectors from the image;
program instructions to determine a first padding value and a first stride value by inputting the feature vectors into the deep neural network;
program instructions to determine a second padding value by inputting the feature vectors into the first multiple regression model for padding;
program instructions to determine a second stride value by inputting the feature vectors into the second multiple regression model for stride;
program instructions to determine padding by averaging the first padding value and the second padding value;
program instructions to determine stride by averaging the first stride value and the second stride value; and
program instructions to classify the image using a convolutional neural network using the padding and the stride,
wherein the program instructions are stored on the computer readable storage medium for execution by the hardware processor via the computer readable memory.

17. The system according to claim 16, wherein the feature vectors include a feature vector of a person in the image and a feature vector of an object in the image.

18. The system according to claim 16, wherein the deep neural network is trained using a training data set including descriptors and corresponding padding and stride value.

19. The system according to claim 16, wherein the first multiple regression model for padding and the second multiple regression model for stride are trained using a training data set including descriptors and corresponding padding and stride values, by decomposing data in the training set into predictors and optimizing multiple regression polynomials based on labeled padding and stride values associated with the predictors.

20. The system according to claim 16, further comprising program instructions to mask a portion of the image,
wherein the classifying the image using the convolutional neural network comprises convolving a filter across the masked portion of the image.

* * * * *